United States Patent [19]

Wrobel et al.

[11] 4,406,679
[45] Sep. 27, 1983

[54] APPARATUS FOR AND METHOD OF PREPARING CRYSTALS FOR WASHING

[75] Inventors: Patrick J. Wrobel; James H. Fraser, both of Andover, Mass.

[73] Assignee: Concentration Specialists, Inc., Andover, Mass.

[21] Appl. No.: 303,881

[22] Filed: Sep. 21, 1981

[51] Int. Cl.$^3$ .............................................. B01D 9/04
[52] U.S. Cl. ........................................ 62/541; 62/542
[58] Field of Search .................. 62/532, 538, 541, 542

[56] References Cited

U.S. PATENT DOCUMENTS 3,501,275  3/1970  Sailer et al. ............................ 62/538
3,662,562  5/1972  Wiegandt et al. ...................... 62/542
4,279,130  7/1981  Finch ..................................... 62/538

Primary Examiner—Frank Sever
Attorney, Agent, or Firm—Abraham Ogman

[57] ABSTRACT

The invention relates to an apparatus for and method of preparing a slurry for a purification apparatus such as a wash column. A slurry is produced in a crystallizer. The crystals are essentially removed from the concentrated mixture and transported to a more dilute solution. The crystals are caused to dwell in the dilute solution to permit the crystals to ripen and to grow in size significantly.

The apparatus that performs the foregoing functions is a gradient column where the change from a concentrated slurry to a dilute slurry takes place. The output of the gradient column is coupled to a holding tank where the residence time of crystals in the dilute solution is prolonged to permit the crystals to ripen.

17 Claims, 1 Drawing Figure

APPARATUS FOR AND METHOD OF PREPARING CRYSTALS FOR WASHING

BACKGROUND OF THE INVENTION

The invention relates to the use of freeze concentration methods and apparatus for separating two or more substances with different freezing points from a solution of a mixture of such substances.

Freeze concentration involves three basic steps. The solution comprising a mixture of substances is cooled until one of the substances freezes out in the form of crystals. The residual solution, called the "mother liquor," is thus concentrated. The crystals are then separated from the concentrated mother liquor. The separated crystals have adhered to their surfaces a quantity of the concentrated mother liquor.

Where the end product is essentially pure crystal, the adhered mother liquor must be removed. Where the end product is the mother liquor, the adhered mother liquor must be removed in order not to sacrifice yield.

Removal of the adhered mother liquor from the crystals is the most critical operation of the three basic steps. The most efficient means for removing mother liquor adhering to a crystal is the wash column, and for this reason, this discussion will be based on the use of a wash column. Other washing devices may be used. For a given volume of slurry being supplied to a wash column, the efficiency of the wash column increases significantly as the size of the crystals increase.

More importantly, larger crystals coated with a less viscous liquor makes it possible to use a smaller and less complicated wash column.

The patent to Ganiaris, U.S. Pat. No. 3,283,522, recognizes and teaches that it is difficult to wash crystals from more viscous concentrated solutions. He also recognizes that additional crystal growth occurs in less concentrated solutions from which they may be more easily washed. Ganiaris' solution, however, is a highly-complicated multi-stage crystallizer network and multiple crystal purifying means.

The principal of concentration gradient columns is described in U.S. Pat. No. 3,681,932 to Huber.

The patent to Shaul, U.S. Pat. No. 3,402,047, describes a system wherein feed is added to crystals after concentrated solution is removed to provide a slurry having a more dilute solution. However, the process of accomplishing this differs considerably from the present invention and presents a greater load on the purifier.

DEFINITIONS

"Feed Stream" is the solution comprising a mixture of substances that is to be purified or concentrated. The feed stream may be contaminated water, sea water, industrial wastes, chemical process streams, or solutions of food such as coffee, orange juice, tea, and milk products. The process is particularly suited to concentrating milk products, as it offers a simple means for separating out lactose or other precipitates that occur during freeze concentration.

"Mother Liquor" is the liquid solution portion of a slurry produced in freeze concentrators.

"Dilute" or "Concentrated" are relative terms which refer to the weight percent of dissolved solutes or suspended particles in a stream.

"Purifier" is a term used to identify the apparatus used to remove solution adhering to the surfaces of crystals. Purifiers may be in the form of wash columns, centrifuges, cyclones, etc.

SUMMARY OF THE INVENTION

It is an object of the invention to provide a freeze concentration system and method which avoids the limitations and disadvantages of prior systems.

It is another object of the invention to increase the average diameter of the crystals supplied to a wash column to improve the efficiency and reduce the cost of wash columns.

It is another object of the invention to provide a freeze concentration system which includes means positioned between the freeze concentrator and the purifier means for (1) transferring the crystals produced in the freeze concentrator from a concentrated mother liquor to a dilute mother liquor and (2) means for causing the crystals in the dilute liquor to grow significantly and (3) to reduce the viscosity of the mother liquor adhered to the crystals.

It is another object of the invention to provide an apparatus for and method of preparing crystals in a concentrated slurry for washing.

It is yet another object of the invention to provide freeze concentration apparatus and method wherein it is more practical to operate a single-stage freeze crystallizer at higher concentrations and lower temperatures.

In accordance with the invention, a freeze concentration apparatus comprises a freeze crystallizer for producing a slurry of crystals in concentrated mother liquor. The concentrated slurry is supplied to a gradient column where the crystals are separated from the concentrated mother liquor and transferred to the dilute mother liquor. Some crystal growth may take place in the gradient column. The resultant dilute slurry is coupled to a holding tank in which the residence time permits significant growth in crystal size. The dilute slurry with enlarged crystals is then supplied to a purifier where the slurry is separated into mother liquor and pure crystals. The mother liquor is then returned to the gradient column. The system also includes means in or prior to the gradient column for removing concentrated mother liquor.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

DESCRIPTION OF THE INVENTION

Figure 1:
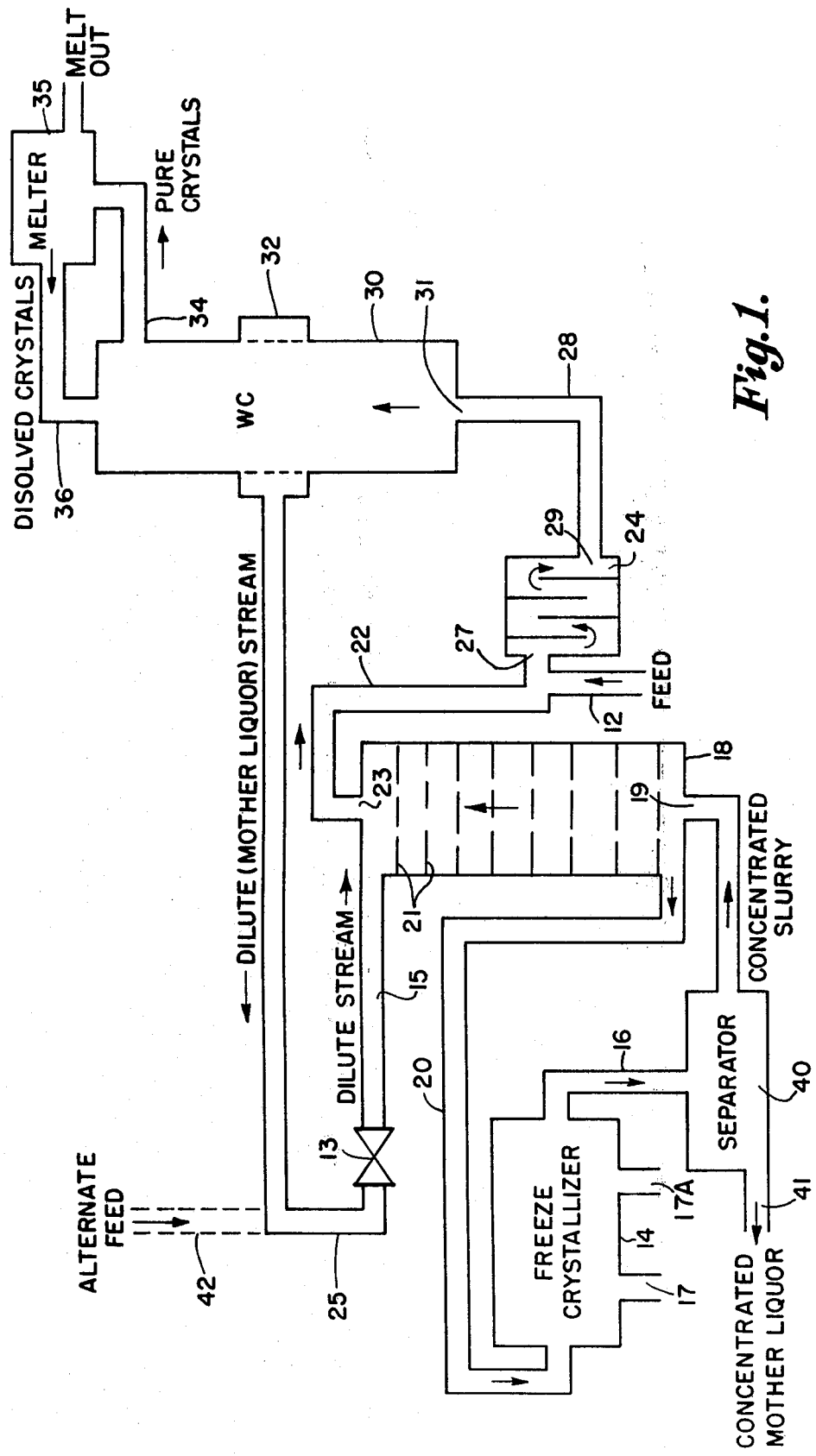
FIG. 1 is a block representation of a freeze concentration system embodying the principle of the present invention.

Referring to FIG. 1, the freeze crystallizer is supplied a concentrated liquor, less concentrated than the liquor leaving the freeze crystallizer, from a gradient column 18 through conduit 20 where it is converted to a first slurry by means of a refrigerant circulating through inlet 17 and outlet 17A.

The first slurry is made up of a concentrated mother liquor and crystals of essentially pure solvent. The concentration of the mother liquor produced in the freeze crystallizer is a function of the temperature of slurry in the freeze crystallizer. The lower the temperature, the greater the concentration.

When the slurry formed in a freeze crystallizer is coupled directly to a purifier such as a wash column, care must be taken to avoid an excessive temperature difference between the entering slurry and the wash liquid. If the temperature difference is excessive, the screen in the wash column will freeze up. This is very detrimental. Known ways of preventing or removing the ice from the screens is wasteful. Further, the slurry is generally made up of relatively small crystals in a relatively viscous liquor. Processing this slurry directly increases the cost and complexity of the wash column significantly.

For these reasons, multiple stages of freeze crystallizers and purifiers are required where, as in the case of concentrated food stuffs, the concentrated mother liquor is the product, and the highest degree of concentration is required.

Another effect militating against highly concentrated feeds to purifiers is the size of crystals produced. It is known that highly concentrated slurries tend to be highly viscous with small crystals and, therefore, much harder to wash.

For reasons to be explained later, the first slurry produced in the freeze concentrator 14 can be highly concentrated.

The first or concentrated slurry is transferred through circuit 16 to an inlet 19 at one end of a gradient column 18 through a separator 40.

At the outlet 41 the concentrated mother liquor may separate from the crystals by a screen, other filter means, or by buoyancy and is removed from the separator 40 through outlet 41. The net downflow of dilute stream in the gradient column 18 is made up by the feed supplied elsewhere.

The gradient column 18 contains a series of spaced baffles 21 which subdivide the column 18 into a plurality of serial stages. When a steady-state condition is achieved, a concentration gradient is created across the length of the column 18 with the bottom stage having the most concentrated slurry and the top stage having the most dilute slurry. The movement of the crystals through the gradient column occurs through a series of progressively more dilute stages. If many stages are used, the concentration at the top approaches that of the dilute stream.

The residual crystals with concentrated mother liquor adhering on the surfaces entering the gradient column 18 move toward the dilute end of the column. A dilute stream entering the gradient column 18 from the top flows counter to the flow of crystals.

The temperature of the dilute slurry at the top of the gradient column 18 is well within the temperature range suitable for minimizing freeze-up of a wash column screen. The dilute slurry has a relatively low viscosity.

The dilute slurry exits the gradient column 18 through outlet 23 and is transferred through a conduit 22 through an inlet 27 to a holding tank 24. In FIG. 1 the feed to the system is coupled through conduit 12 where it combines with the dilute slurry from the gradient column 18. A smaller gradient column 18 can be used with the feed in this position. Alternately, the feed may be supplied through a conduit 42 which is shown in the dotted outline. The purpose of the holding tank 24 is to increase the residence time of the crystals within the dilute mother liquor to permit the crystals to ripen and to increase significantly in size. Optionally, the holding tank 24 may be made as an integral part of the gradient column by adding the holding tank to the dilute end of the gradient column.

The importance of increasing the average diameter of the crystals and lowering the viscosity of the mother liquor rests on the knowledge that the wash column capacity is not dependent on concentration. The area of the wash column is proportional to the viscosity of the mother liquor, but it is inversely proportional to the square of the crystal diameter. It, therefore, follows that even where the ratio of change of viscosity is equal to the ratio of change of the crystal diameter, there is a significant benefit to taking affirmative steps to increase the average diameter of the crystals.

The dilute slurry with enlarged crystals is transferred from outlet 29 through conduit 28 to an inlet 31 of a wash column 30.

The wash column 30 functions conventionally. The slurry moves up the wash column until a screen 32 is encountered. Mother liquor is separated from the crystals through the screen 32. The exiting mother liquor constitutes a dilute liquor stream and is transferred through conduit 38 and valve 13 to the dilute end of the gradient column.

The crystals within the wash column continue moving up the wash column where they are washed by an incoming liquid which generally comprises dissolved crystals. The washing liquid displaces mother liquor from the surfaces of the crystals purifying the crystals. The pure crystals are removed from the wash column through conduit 34 and melted in melter 35. A portion of the melted crystals is supplied to the wash column 30 through conduit 36 to wash the crystals and to displace the mother liquor from the surface of the crystals.

Specifically, a faster throughput through the wash column can be realized with large crystals in a dilute mother liquor. Start-up times are reduced, and because there is less exposure to the washing process, there is less degradation.

Because smaller wash columns can be used relative to other crystallization techniques, a very material savings in equipment cost can be realized.

A third benefit of the disclosed techniques is improved washing of the crystals and consequently, a purer melt. Where the product is the concentrated mother liquor, higher yields are realized.

It is also known that the presence of precipitates in the wash column is deleterious as the precipitates carried to the wash column may redissolve in the wash water and appear as an impurity in the dissolved crystals. In the described process, precipitates may be removed at the concentrated end of the gradient column or any subsequent intermediate stage before the crystals reach the wash column.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

We claim:

1. A subassembly for preparing crystals for washing comprising:
    a concentration gradient column having an inlet and an outlet containing a plurality of stages each containing a slurry of mother liquor and crystals, the concentrations of the slurry in each stage being different and varying from concentrated at the inlet of the column to dilute at the outlet, said column having means for receiving a concentrated slurry prior to or at the inlet and a delivering dilute liquor at the outlet, said column also including means for removing concentrated mother liquor at the inlet and means for removing dilute slurry from the other end; and holding tank means coupled directly to the outlet of the gradient column for receiving and storing dilute slurry to increase the residence time of said crystals in said dilute slurry to enable the crystals contained therein to ripen and grow in size.

2. A subassembly as defined in claim 1 wherein the gradient column and/or holding tank comprise a plurality of serially-connected containers.

3. A subassembly as defined in claim 2 wherein the holding tank is dimensioned to hold the dilute slurry to allow the crystals to grow in size.

4. A subassembly as defined in claim 2 wherein the stages of the concentration gradient column combined with the holding tank provide a residence time for the slurry to cause the crystals to grow in size.

5. A freeze concentration system for a liquid feed stream containing a mixture of substances comprising:

crystallizing means producing a concentrated slurry from said liquid feed, said slurry having crystals of one of said substances in a concentrated mother liquor of said liquid mixture;

means for transferring said crystals from said concentrated liquid mixture to a dilute, less viscous liquid to form a dilute slurry;

means for receiving said dilute slurry directly from the outlet of the gradient column for increasing the residence time of said crystals in said dilute slurry for permitting said crystals to grow in size, said enlarged crystals containing mother liquor adhering on their surfaces; and washing means coupled directly to said holding tank for purifying said enlarged crystals and for separating said purified crystals from the dilute mother liquor.

6. A system as described in claim 5 wherein said washing means is a wash column.

7. A system as described in claim 5 wherein said wash column includes, in addition, means for coupling said dilute mother liquor to said transfer means for reprocessing.

8. A system as described in claim 5 wherein said means for enlarging said crystals is a plurality of serially-connected containers.

9. A freeze concentration system for a liquid feed stream containing a mixture of substances comprising:

crystallizing means producing a concentrated slurry from said slurry having crystals of one of said substances in a concentrated mother liquor of said liquid mixture;

a concentration gradient column for receiving said first slurry at one end and a dilute liquor stream at the other end, said crystals flowing countercurrent to said dilute liquor stream, said column containing first outlet means adjacent to said one end for removing concentrated mother liquor, second outlet means adjacent to said other end for removing a dilute slurry containing crystals in a dilute mother liquor;

means combining the feed stream with said dilute slurry;

means for receiving said dilute slurry for increasing the residence time of said crystals in said dilute slurry in a gradient column feed stream and for permitting said crystals to ripen and grow, said ripened crystals containing mother liquor adhering on their surfaces; and washing means for purifying said ripened crystals and for separating said purified crystals from the dilute mother liquor.

10. A system as described in claim 9 wherein said washing means is a wash column.

11. A system as described in claim 10 which includes, in addition, means for melting said purified crystals and utilizing a portion of the melted crystals to said washing means to purify said crystals.

12. A freeze concentration process comprising:

cooling a first stream containing a solute to form a slurry of essentially pure solvent crystals in a concentrated mother liquor, said crystals having mother liquor adhered to the surfaces of said crystals;

substituting a less viscous dilute mother liquor for said concentrated mother liquor to form a dilute slurry in a gradient column;

passing said dilute slurry directly to a holding tank to allow said crystals to dwell in said dilute mother liquor to enlarge the size of the crystals;

passing said dilute slurry with enlarged crystals to a purifier for removing dilute mother liquor from the surface of the enlarged crystals; and supplying feed to said dilute stream or dilute slurry.

13. A process as defined in claim 12 wherein the purifier is a wash column.

14. A process as defined in claim 13 wherein the substitution takes place in a gradient column.

15. A process as defined in claim 13 wherein the crystal growth takes place in said gradient column.

16. A process as defined in claim 13 which includes, in addition, the step of removing concentrated mother liquor from the system.

17. A process as defined in claim 13 which includes, in addition, the step of removing solids from the system before the dilute slurry enters the purifier.

* * * * *